United States Patent
Li

(10) Patent No.: US 9,992,616 B2
(45) Date of Patent: Jun. 5, 2018

(54) INFORMATION PROCESSING METHOD AND NFC TERMINAL

(71) Applicant: Huawei Technologies Co., Ltd., Shenzhen, Guangdong (CN)

(72) Inventor: Guoqing Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/515,576

(22) PCT Filed: Sep. 30, 2014

(86) PCT No.: PCT/CN2014/087945
§ 371 (c)(1),
(2) Date: Mar. 29, 2017

(87) PCT Pub. No.: WO2016/049852
PCT Pub. Date: Apr. 7, 2016

(65) Prior Publication Data
US 2017/0303077 A1   Oct. 19, 2017

(51) Int. Cl.
*H04W 4/00*     (2018.01)
*H04B 5/00*     (2006.01)
(Continued)

(52) U.S. Cl.
CPC .......... *H04W 4/008* (2013.01); *H04B 5/0031* (2013.01)

(58) Field of Classification Search
CPC ....... H04W 4/008; H04W 24/08; H04W 4/00; H04W 12/06; H04B 5/0031; H04B 17/20; H04L 12/40104; H04L 29/06945
See application file for complete search history.

(56) References Cited

U.S. PATENT DOCUMENTS 7,775,442 B2    8/2010   Saarisalo
8,196,131 B1 *  6/2012   von Behren ......... G06Q 20/367
                                                  705/64
(Continued)

FOREIGN PATENT DOCUMENTS

CN    102325210 A    1/2012
CN    103065107 A    4/2013
(Continued)

OTHER PUBLICATIONS

GlobalPlatform, "GlobalPlafform Card, Contactless Services Card Specification v2.2—Amendment C Version 1.0.1", Feb. 2012, 104 pages.
(Continued)

*Primary Examiner* — Andrew Wendell

(57) ABSTRACT

The present invention provides an information processing method and an NFC terminal. The method includes: monitoring a state of a TCP connection that is established by at least one secure element SE in a near field communication NFC terminal to a server by using a Transmission Control Protocol TCP port of the NFC terminal; when monitoring that the state of the TCP connection is disconnected, determining a first SE from the at least one SE, where the first SE is an SE corresponding to a TCP port whose TCP connection is disconnected; and obtaining an application identifier AID of a contactless application in the first SE.

20 Claims, 5 Drawing Sheets

(51) Int. Cl.
*H04B 17/20* (2015.01)
*H04L 29/06* (2006.01)

(56) References Cited

U.S. PATENT DOCUMENTS

| | | | |
|---|---|---|---|
| 8,646,059 B1 | 2/2014 | Von Behren et al. | |
| 8,942,672 B2* | 1/2015 | Renard | G06Q 20/3278 455/41.2 |
| 2001/0052006 A1* | 12/2001 | Barker | H04L 41/0213 709/223 |
| 2011/0087610 A1* | 4/2011 | Batada | G06F 21/72 705/318 |
| 2012/0130838 A1 | 5/2012 | Koh et al. | |
| 2012/0149302 A1 | 6/2012 | Sekiya et al. | |
| 2012/0317628 A1* | 12/2012 | Yeager | G06Q 20/204 726/5 |
| 2013/0109307 A1* | 5/2013 | Reisgies | H04L 63/08 455/41.1 |
| 2013/0225073 A1 | 8/2013 | O'Donoghue et al. | |
| 2013/0331029 A1 | 12/2013 | Tang et al. | |
| 2014/0035727 A1 | 2/2014 | Nguyen | |
| 2015/0186871 A1* | 7/2015 | Laracey | G06Q 20/3278 705/41 |
| 2015/0371226 A1* | 12/2015 | Hurley | G06Q 20/40 705/64 |
| 2016/0054989 A1* | 2/2016 | Diebolt | G06F 8/61 717/177 |
| 2016/0309287 A1 | 10/2016 | Nguyen | |

FOREIGN PATENT DOCUMENTS

| | | |
|---|---|---|
| CN | 103208065 A | 7/2013 |
| CN | 103222291 A | 7/2013 |
| CN | 103491589 A | 1/2014 |
| CN | 104025137 A | 9/2014 |
| EP | 2672735 A1 | 12/2013 |

OTHER PUBLICATIONS

GlobalPlatform, "GlobalPlafform Card Technology, Contactless Services Card Specification v2.2—Amendment C Version 1.1.1", Jul. 2014, 126 pages.

GlobalPlatform, "GlobalPlafform Card, Contactless Services Card Specification v2.2—Amendment C Version 1.1", Apr. 2013, 125 pages.

* cited by examiner

INFORMATION PROCESSING METHOD AND NFC TERMINAL

CROSS REFERENCE TO RELATED APPLICATIONS

The present application claims priority under 35 U.S.C. § 365 to International Patent Application No. PCT/CN2014/087945 filed Sep. 30, 2014 which is incorporated herein by reference into the present disclosure as if fully set forth herein.

TECHNICAL FIELD

The present invention relates to the field of communications technologies, and in particular, to an information processing method and an NFC terminal.

BACKGROUND

With development of a mobile communications technology and a near field communication (English: Near Field Communication, NFC for short) technology, more mobile terminals support a payment service that has a relatively high requirement on a security level. This mobile terminal is referred to as an NFC terminal. Generally, the NFC terminal includes a near field communication controller (English: Near Field Communication Controller, NFCC for short), an NFC antenna, and at least one secure element (English: Secure Element, SE for short).

With development of the mobile payment industry, one NFC terminal can include multiple SEs, and multiple contactless applications can be installed in each SE. For convenience of distinguishing multiple contactless applications, generally each contactless application has one application identifier (English: Application Identification, AID for short). When the NFC terminal enters a radio frequency field of an NFC card reader, an NFC antenna generates an induced current, and an NFCC connected to the NFC antenna receives a contactless application selection command sent by the NFC card reader. To forward the command to a correct SE, a device host (English: Device Host, DH for short) of the NFC terminal needs to configure routing information for the NFCC, that is, configure a correspondence between the AID and the SE, and other routing information into the NFCC. In this way, the NFCC can forward the command to the correct SE, and then select a correct contactless application.

In the prior art, a method for the DH to configure the routing information into the NFCC is: A method of statically reporting an AID of a contactless application is provided by using a companion application of the contactless application and a configuration file that is written into the NFC terminal. Specifically, the contactless application is installed into the SE, and the companion application of the contactless application is also installed into the NFC terminal, where the companion application includes a configuration file, and the configuration file identifies the AID of the contactless application. When an application manager is refreshed, the companion application is discovered, and the AID in the configuration file in the companion application is obtained, and is configured into the NFCC. However, this method is not flexible enough. For a contactless application that does not have a companion application, even if the contactless application is installed into the SE, the terminal cannot obtain an AID.

Therefore, a disadvantage of the prior art is: An NFC terminal cannot obtain an AID of a contactless application in an SE in real time.

SUMMARY

Embodiments of the present invention provide an information processing method and an NFC terminal, so as to resolve a technical problem in the prior art that an NFC terminal cannot obtain an AID of a contactless application in an SE in real time, and provide a technical solution for the NFC terminal to obtain the AID of the contactless application in the SE in real time, so that the NFC terminal obtains the AID of the contactless application in the SE in real time, and a DH of the NFC terminal configures an NFCC routing table more properly and effectively.

A first aspect of the embodiments of the present invention provides an information processing method, where the method includes:

monitoring a state of a TCP connection that is established by at least one secure element SE in a near field communication NFC terminal to a server by using a Transmission Control Protocol TCP port of the NFC terminal;

when monitoring that the state of the TCP connection is disconnected, determining a first SE from the at least one SE, where the first SE is an SE corresponding to a TCP port whose TCP connection is disconnected; and obtaining an application identifier AID of a contactless application in the first SE.

With reference to the first aspect, in a first possible implementation manner of the first aspect, the obtaining an application identifier AID of a contactless application in the first SE specifically includes:

sending a first command to the first SE, where the first command is used to query a quantity of update times of all contactless applications in the first SE, and receiving a response message, sent by the first SE, of the first command;

parsing the response message of the first command, to obtain a first global update counter GUC value, where the first GUC value is the quantity of update times of all the contactless applications in the first SE; and when the first GUC value is different from a second GUC value, obtaining a first AID, where the first AID is an AID in the response message of the first command, and the second GUC value is a quantity, stored in a non-volatile memory of the NFC terminal, of update times of all the contactless applications in the first SE.

With reference to the first possible implementation manner of the first aspect, in a second possible implementation manner of the first aspect, after the obtaining a first AID, the method further includes:

comparing the first AID with all AIDs stored in the non-volatile memory; and if the first AID is different from all the AIDs stored in the non-volatile memory, obtaining an identifier SE ID of the first SE, and saving, in the non-volatile memory, a data record that includes at least the first AID and the SE ID.

With reference to the second possible implementation manner of the first aspect, in a third possible implementation manner of the first aspect, after the comparing the first AID with all AIDs stored in the non-volatile memory, the method further includes:

if the first AID is the same as one AID stored in the non-volatile memory, sending a second command to the first SE, where the second command is used to query a lifecycle state of the first AID, and receiving a response message, sent by the first SE, of the second command;

parsing the response message of the second command, to obtain the lifecycle state of the first AID; and updating the lifecycle state that is of the first AID and that is stored in the non-volatile memory.

With reference to the first aspect, in a fourth possible implementation manner of the first aspect, the obtaining an application identifier AID of a contactless application in the first SE specifically includes:

sending a third command to the first SE, where the third command is used to obtain AIDs of all contactless applications in the first SE, and receiving a response message, sent by the first SE, of the third command; and parsing the response message of the third command, to obtain a third AID, where the third AID is an AID in the response message of the third command.

With reference to the fourth possible implementation manner of the first aspect, in a fifth possible implementation manner of the first aspect, after the obtaining a third AID, the method further includes:

comparing the third AID with all AIDs stored in a non-volatile memory of the NFC terminal; and if the third AID is different from all the AIDs stored in the non-volatile memory, obtaining an identifier SE ID of the first SE, and saving, in the non-volatile memory, a data record that includes at least the third AID and the SE ID.

With reference to the fifth possible implementation manner of the first aspect, in a sixth possible implementation manner of the first aspect, after the comparing the third AID with all AIDs stored in a non-volatile memory of the NFC terminal, the method further includes:

if the third AID is the same as one AID stored in the non-volatile memory, comparing a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, sending a fourth command to the first SE, where the fourth command is used to query a lifecycle state of the third AID, and receiving a response message, sent by the first SE, of the fourth command;

parsing the response message of the fourth command, to obtain the lifecycle state of the third AID; and updating the lifecycle state and the UC values that are of the third AID and that are stored in the non-volatile memory.

A second aspect of the present invention provides an information processing method, where the method includes:

receiving application change notification information sent by a server; and obtaining an application identifier AID of a contactless application in a first secure element SE, where the first SE is an SE that is in a near field communication NFC terminal and that communicates with the server.

With reference to the second aspect, in a first possible implementation manner of the second aspect, the obtaining an AID of a contactless application in a first SE specifically includes:

parsing the application change notification information, to obtain an AID in the application change notification information.

With reference to the second aspect, in a second possible implementation manner of the second aspect, the obtaining an AID of a contactless application in a first SE specifically includes:

sending a first command to the first SE, where the first command is used to query a quantity of update times of all contactless applications in the first SE, and receiving a response message, sent by the first SE, of the first command;

parsing the response message of the first command, to obtain a first global update counter GUC value, where the first GUC value is the quantity of update times of all the contactless applications in the first SE; and when the first GUC value is different from a second GUC value, obtaining a first AID, where the first AID is an AID in the response message of the first command, and the second GUC value is a quantity, stored in a non-volatile memory of the NFC terminal, of update times of all the contactless applications in the first SE.

With reference to the second aspect, in a third possible implementation manner of the second aspect, the obtaining an AID of a contactless application in a first SE specifically includes:

sending a third command to the first SE, where the third command is used to obtain AIDs of all contactless applications in the first SE, and receiving a response message, sent by the first SE, of the third command; and parsing the response message of the third command, to obtain a third AID, where the third AID is an AID in the response message of the third command.

With reference to the first possible implementation manner of the second aspect, in a fourth possible implementation manner of the second aspect, after the obtaining an AID in the application change notification information, the method further includes:

comparing the first AID with all AIDs stored in the non-volatile memory; and if the first AID is different from all the AIDs stored in the non-volatile memory, obtaining an identifier SE ID of the first SE, and saving, in the non-volatile memory, a data record that includes at least the first AID and the SE ID.

With reference to the fourth possible implementation manner of the second aspect, in a fifth possible implementation manner of the second aspect, after the comparing the first AID with all AIDs stored in the non-volatile memory, the method further includes:

if the first AID is the same as one AID stored in the non-volatile memory, sending a second command to the first SE, where the second command is used to query a lifecycle state of the first AID, and receiving a response message, sent by the first SE, of the second command;

parsing the response message of the second command, to obtain the lifecycle state of the first AID; and updating the lifecycle state that is of the first AID and that is stored in the non-volatile memory.

With reference to the second possible implementation manner of the second aspect, in a sixth possible implementation manner of the second aspect, after the obtaining a first AID, the method further includes:

comparing the first AID with all AIDs stored in the non-volatile memory; and if the first AID is different from all the AIDs stored in the non-volatile memory, obtaining an identifier SE ID of the first SE, and saving, in the non-volatile memory, a data record that includes at least the first AID and the SE ID.

With reference to the sixth possible implementation manner of the second aspect, in a seventh possible implementation manner of the second aspect, after the comparing the first AID with all AIDs stored in the non-volatile memory, the method further includes:

if the first AID is the same as one AID stored in the non-volatile memory, sending a second command to the first SE, where the second command is used to query a lifecycle state of the first AID, and receiving a response message, sent by the first SE, of the second command;

parsing the response message of the second command, to obtain the lifecycle state of the first AID; and updating the lifecycle state that is of the first AID and that is stored in the non-volatile memory.

With reference to the third possible implementation manner of the second aspect, in an eighth possible implementation manner of the second aspect, after the obtaining a third AID, the method further includes:

comparing the third AID with all AIDs stored in a non-volatile memory of the NFC terminal; and if the third AID is different from all the AIDs stored in the non-volatile memory, obtaining an identifier SE ID of the first SE, and saving, in the non-volatile memory, a data record that includes at least the one AID that participates in the comparison and the SE ID.

With reference to the eighth possible implementation manner of the second aspect, in a ninth possible implementation manner of the second aspect, after the comparing the third AID with all AIDs stored in a non-volatile memory of the NFC terminal, the method further includes:

if the third AID is the same as one AID stored in the non-volatile memory, comparing a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, sending a fourth command to the first SE, where the fourth command is used to query a lifecycle state of the third AID, and receiving a response message, sent by the first SE, of the fourth command;

parsing the response message of the fourth command, to obtain the lifecycle state of the third AID; and updating the lifecycle state and the UC values that are of the third AID and that are stored in the non-volatile memory.

A third aspect of the present invention provides a near field communication NFC terminal, including:

a secure element SE interface, configured to connect an SE to the NFC terminal;

a non-volatile memory, configured to store an application identifier AID of a contactless application in the SE;

a Transmission Control Protocol TCP port; and a processor, connected to the non-volatile memory, the SE interface, and the TCP port by using a bus, and configured to:

monitor a state of a TCP connection that is established by at least one secure element SE in a near field communication NFC terminal to a server by using a Transmission Control Protocol TCP port of the NFC terminal;

when monitoring that the state of the TCP connection is disconnected, determine a first SE from the at least one SE, where the first SE is an SE corresponding to a TCP port whose TCP connection is disconnected; and obtain an application identifier AID of a contactless application in the first SE.

With reference to the third aspect, in a first possible implementation manner of the third aspect, the processor is further configured to:

send a first command to the first SE, where the first command is used to query a quantity of update times of all contactless applications in the first SE, and receive a response message, sent by the first SE, of the first command;

parse the response message of the first command, to obtain a first global update counter GUC value, where the first GUC value is the quantity of update times of all the contactless applications in the first SE; and when the first GUC value is different from a second GUC value, obtain a first AID, where the first AID is an AID in the response message of the first command, and the second GUC value is a quantity, stored in a non-volatile memory of the NFC terminal, of update times of all the contactless applications in the first SE.

With reference to the first possible implementation manner of the third aspect, in a second possible implementation manner of the third aspect, the processor is further configured to: after obtaining the first AID, compare the first AID with all AIDs stored in the non-volatile memory; and if the first AID is different from all the AIDs stored in the non-volatile memory, obtain an identifier SE ID of the first SE, and save, in the non-volatile memory, a data record that includes at least the first AID and the SE ID.

With reference to the second possible implementation manner of the third aspect, in a third possible implementation manner of the third aspect, the processor is further configured to:

after comparing the first AID with all the AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

With reference to the third aspect, in a fourth possible implementation manner of the third aspect, the processor is further configured to:

send a third command to the first SE, where the third command is used to obtain AIDs of all contactless applications in the first SE, and receive a response message, sent by the first SE, of the third command; and parse the response message of the third command, to obtain a third AID, where the third AID is an AID in the response message of the third command.

With reference to the fourth possible implementation manner of the third aspect, in a fifth possible implementation manner of the third aspect, the processor is further configured to:

after obtaining the third AID, compare the third AID with all AIDs stored in a non-volatile memory of the NFC terminal; and if the third AID is different from all the AIDs stored in the non-volatile memory, obtain an identifier SE ID of the first SE, and save, in the non-volatile memory, a data record that includes at least the third AID and the SE ID.

With reference to the fifth possible implementation manner of the third aspect, in a sixth possible implementation manner of the third aspect, the processor is further configured to:

after comparing the third AID with all the AIDs stored in the non-volatile memory of the NFC terminal, if the third AID is the same as one AID stored in the non-volatile memory, compare a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, send a fourth command to the first SE, where the fourth command is used to query a lifecycle state of the third AID, and receive a response message, sent by the first SE, of the fourth command;

parse the response message of the fourth command, to obtain the lifecycle state of the third AID; and update the lifecycle state and the UC values that are of the third AID and that are stored in the non-volatile memory.

With reference to the third aspect, in a seventh possible implementation manner of the third aspect, the processor is further configured to:

receive application change notification information sent by a server; and obtain an application identifier AID of a contactless application in a first secure element SE, where the first SE is an SE that is in a near field communication NFC terminal and that communicates with the server.

With reference to the seventh possible implementation manner of the third aspect, in an eighth possible implementation manner of the third aspect, the processor is further configured to:

parse the application change notification information, to obtain an AID in the application change notification information.

With reference to the seventh possible implementation manner of the third aspect, in a ninth possible implementation manner of the third aspect, the processor is further configured to:

send a first command to the first SE, where the first command is used to query a quantity of update times of all contactless applications in the first SE, and receive a response message, sent by the first SE, of the first command;

parse the response message of the first command, to obtain a first global update counter GUC value, where the first GUC value is the quantity of update times of all the contactless applications in the first SE; and when the first GUC value is different from a second GUC value, obtain a first AID, where the first AID is an AID in the response message of the first command, and the second GUC value is the quantity, stored in a non-volatile memory of the NFC terminal, of update times of all the contactless applications in the first SE.

With reference to the seventh possible implementation manner of the third aspect, in a tenth possible implementation manner of the third aspect, the processor is further configured to:

send a third command to the first SE, where the third command is used to obtain AIDs of all contactless applications in the first SE, and receive a response message, sent by the first SE, of the third command; and parse the response message of the third command, to obtain a third AID, where the third AID is an AID in the response message of the third command.

With reference to the eighth possible implementation manner of the third aspect, in an eleventh possible implementation manner of the third aspect, the processor is further configured to:

after obtaining the AID in the application change notification information, compare the first AID with all AIDs stored in the non-volatile memory; and if the first AID is different from all the AIDS stored in the non-volatile memory, obtain an identifier SE ID of the first SE, and save, in the non-volatile memory, a data record that includes at least the first AID and the SE ID.

With reference to the eleventh possible implementation manner of the third aspect, in a twelfth possible implementation manner of the third aspect, the processor is further configured to:

after comparing the first AID with all the AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

With reference to the ninth possible implementation manner of the third aspect, in a thirteenth possible implementation manner of the third aspect, the processor is further configured to:

after obtaining the first AID, compare the first AID with all AIDs stored in a non-volatile memory; and if the first AID is different from all the AIDs stored in the non-volatile memory, obtain an identifier SE ID of the first SE, and save, in the non-volatile memory, a data record that includes at least the first AID and the SE ID.

With reference to the thirteenth possible implementation manner of the third aspect, in a fourteenth possible implementation manner of the third aspect, the processor is further configured to:

after comparing the first AID with all the AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

With reference to the tenth possible implementation manner of the third aspect, in a fifteenth possible implementation manner of the third aspect, the processor is further configured to:

after obtaining the third AID, compare the third AID with all AIDs stored in a non-volatile memory of the NFC terminal; and if the third AID is different from all the AIDs stored in the non-volatile memory, obtain an identifier SE ID of the first SE, and save, in the non-volatile memory, a data record that includes at least the one AID that participates in the comparison and the SE ID.

With reference to the fifteenth possible implementation manner of the third aspect, in a sixteenth possible implementation manner of the third aspect, the processor is further configured to:

after comparing the third AID with all the AIDs stored in the non-volatile memory of the NFC terminal, if the third AID is the same as one AID stored in the non-volatile memory, compare a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, send a fourth command to the first SE, where the fourth command is used to query a lifecycle state of the third AID, and receive a response message, sent by the first SE, of the fourth command;

parse the response message of the fourth command, to obtain the lifecycle state of the third AID; and update the lifecycle state and the UC values that are of the third AID and that are stored in the non-volatile memory.

One or more technical solutions provided in the embodiments of the present invention have at least the following technical effects or advantages:

In the embodiments of the present invention, a state of a TCP connection that is established by at least one secure element SE in a near field communication NFC terminal to a server by using a Transmission Control Protocol TCP port of the NFC terminal is monitored. When it is monitored that the state of the TCP connection is disconnected, an SE corresponding to a TCP port whose TCP connection is disconnected is determined from the at least one SE. An application identifier AID of a contactless application in the SE corresponding to the TCP port whose TCP connection is disconnected is obtained. Alternatively, application change notification information sent by the server is received. An application identifier AID of a contactless application in an SE that is in the NFC terminal and that communicates with the server is obtained.

Therefore, in the embodiments of the present invention, that a state of a TCP connection between an NFC terminal and a server changes to a disconnected state or that an NFC terminal receives an application change notification message sent by a server is used as a trigger condition, to trigger a DH of the NFC terminal to use, according to different trigger conditions, different manners to obtain an AID in an SE corresponding to the TCP port whose TCP connection is disconnected, or obtain an AID in an SE that communicates with the server. It is implemented that the DH obtains an AID in an SE in real time, so that the DH of the NFC terminal configures an NFCC routing table more properly and effectively.

BRIEF DESCRIPTION OF THE DRAWINGS

To describe the technical solutions in the present invention or in the prior art more clearly, the following briefly describes the accompanying drawings required for describing the present invention or the prior art. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
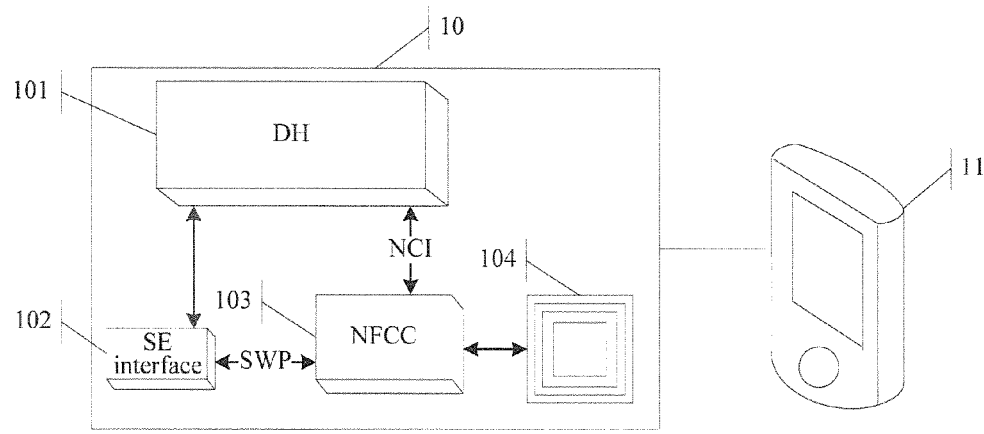
FIG. 1 is a possible architectural diagram of a communications system applicable to an information processing method according to an embodiment of the present invention.

Embodiments of the present invention provide an information processing method and an NFC terminal, so as to resolve a technical problem in the prior art that an NFC terminal cannot obtain an AID of a contactless application in an SE in real time, and provide a technical solution for the NFC terminal to obtain the AID of the contactless application in the SE in real time, so that the NFC terminal obtains the AID of the contactless application in the SE in real time, and then a DH of the NFC terminal configures an NFCC routing table more properly and effectively.

In the embodiments of the present invention, a state of a TCP connection that is established by at least one secure element SE in a near field communication NFC terminal to a server by using a Transmission Control Protocol TCP port of the NFC terminal is monitored. When it is monitored that the state of the TCP connection is disconnected, an SE corresponding to a TCP port whose TCP connection is disconnected is determined from the at least one SE. An application identifier AID of a contactless application in the SE corresponding to the TCP port whose TCP connection is disconnected is obtained. Alternatively, application change notification information sent by the server is received. An application identifier AID of a contactless application in an SE that is in the NFC terminal and that communicates with the server is obtained.

Therefore, in the embodiments of the present invention, that a state of a TCP connection between an NFC terminal and a server changes to a disconnected state or that an NFC terminal receives an application change notification message sent by a server is used as a trigger condition, to trigger a DH of the NFC terminal to use, according to different trigger conditions, different manners to obtain an AID in an SE corresponding to the TCP port whose TCP connection is disconnected, or obtain an AID in an SE that communicates with the server. It is implemented that the DH obtains an AID in an SE in real time, so that the DH of the NFC terminal configures an NFCC routing table more properly and effectively.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

The following describes implementation manners of the present invention in detail with reference to accompanying drawings.

An embodiment of the present invention provides an information processing method. Referring to FIG. 1, FIG. 1 is a possible architectural diagram of a communications system applicable to an information processing method according to an embodiment of the present invention. The communications system includes: an NFC (English: Near Field Communication, NFC for short) terminal 10 and an NFC card reader 11.

The NFC terminal 10 includes:

a device host 101 (English: Device Host, DH for short), where it is generally considered that a central processing unit (English: Central Progress Unit, CPU for short) of the NFC terminal is the DH; according to a definition in a related standard of the NFC Forum, the DH is a running environment responsible for managing an NFC Forum certification device and all peripheral circuits of the NFC Forum certification device, and is an entity configured to manage initialization, configurations, and power supplies of all peripheral circuits and components including a near field communication controller; generally a common operating system runs in the DH, such as a BlackBerry operating system (an operating system used in a BlackBerry mobile phone of the Canadian BlackBerry company), a Windows phone operating system (an operating system developed by Microsoft for mobile devices), an Android operating system (an operating system that is based on free and open source code of Linux, and is mainly used in a mobile device), an iOS operating system (a mobile operating system developed by Apple), or the like;

a secure element (English: Secure Element, SE for short) interface 102, disposed in the NFC terminal, where a most common SE is integrated into a subscriber identity identification (English: Subscriber Identity Module, SIM for short) card, the SIM card is inserted into the NFC terminal by using the SE interface, the SE is a part of the SIM card, the SE is connected to an NFCC by using a pin of the SIM card, and the SE can communicate with the DH by using the NFCC; it should be noted that, the SE is not limited to being integrated into the SIM card; a lightweight operating system different from that in the DH runs in the SE, for example, a Java Card platform (which includes the Java Card platform; a Java Card runtime environment, that is, the JCRE; and a Java Card API) of the Oracle (Oracle) company; therefore, communication between the SE and the DH is communication across operating systems, and information is carried by using an application protocol data unit (English: Application Protocol Data Unit, ADPU for short); the ADPU refers to a data unit in a fixed format, and is used for communication between an application or a security domain in the SE and an entity outside the SE; and a related APDU command in this embodiment of the present invention is defined in the Global Platform Card Specification V2.2.1 specification and a related amendment (that is, an amendment C: Contactless Services, contactless services); and the SE is a microcontroller that has a content tampering prevention function, and provides a secure storage and running environment to a contactless application installed in the SE. as a secure carrier of mobile payment, the SE is not only responsible for performing secure storage and calculation on transaction key data, and ensuring that a sensitive transaction that is performed has security authentication and non-repudiation, but also needs to support dynamic management and running security of multiple applications; and in the NFC terminal field, common SEs include: a UICC SE (English: Universal Integrated Circuit Card with Secure Element, Chinese: universal integrated circuit card with secure element), a pSD SE (English: microSD Secure Element, Chinese: micro SD secure element) and an eSE (English: embedded Secure Element, Chinese: embedded secure element);

a near field communication controller 103 (English: Near Field Communication Controller, NFCC for short), where the near field communication controller 103 communicates with the DH by using an NCI (English: NFC Controller Interface, Chinese: near field communication controller interface), and is connected to and communicates with the SE generally by using a Single Wire Protocol (English: Single Wire Protocol, SWP for short) interface, and according to a definition of a related standard of the NFC Forum, the NFCC is a logical entity responsible for sending and receiving data by using an NFC radio frequency interface; and an NFC antenna 104, where the NFCC may send and receive data by using an antenna; when the NFC terminal enters a radio frequency field of the NFC card reader 11, the NFC antenna generates an induced current, to activate the SWP interface, so that the NFC card reader can communicate with the contactless application in the SE, where the contactless application (English: Contactless Application, CA for short) refers to an application that is installed into the SE or the NFC terminal and that needs to communicate with the outside by using a contactless interface (an NFC interface). Generally, multiple CAs are installed in the SE, and to distinguish different CAs, the different CAs are identified by using application identifiers (English: Application Identification, AID for short). In an environment of one SE, an AID is unique and is not repeated. An AID used in the present invention refers to an AID defined and used in the GP (Global Platform) specification. A length of the AID is 5 to 16 bytes. The AID complies with the ISO (English: International Standard Organization, Chinese: International Standard Organization)/IEC (English: International Electrotechnical Commission, Chinese: International Electrotechnical Commission) 7816-5 2004 specification and the ETSI (English: European Telecommunications Standards Institute, Chinese: European Telecommunications Standards Institute) TS 101 220 V3.0.0 (2000-05) specification, and includes two parts: a 5-byte RID (English: Registered application provider Identifier, Chinese: registered application provider identifier) and a PIX (English: Proprietary application Identifier eXtension, Chinese: proprietary application identifier extension) that is 11 bytes at most, where the RID is a mandatory field, and the PIX is an optional field.

The following describes, from an NFC terminal side, the information processing method provided in this embodiment of the present invention.

Embodiment 1

In this embodiment of the present invention, an NFC terminal establishes a TCP connection to a server by using a group of fixed TCP ports. Specifically, each SE in the NFC terminal establishes a TCP connection to the server by using a preset TCP port, for example, a Hyper Text Transfer Protocol over Secure Socket Layer (English: Hyper Text Transfer Protocol over Secure Socket Layer, HTTPS for short) port number 443, a WAP-push-http (wap push that is based on HTTP) port number 4035, a wap-push-https (wap push that is based on HTTPS) port number 4036, or a port number customized by another vendor.

Figure 2:
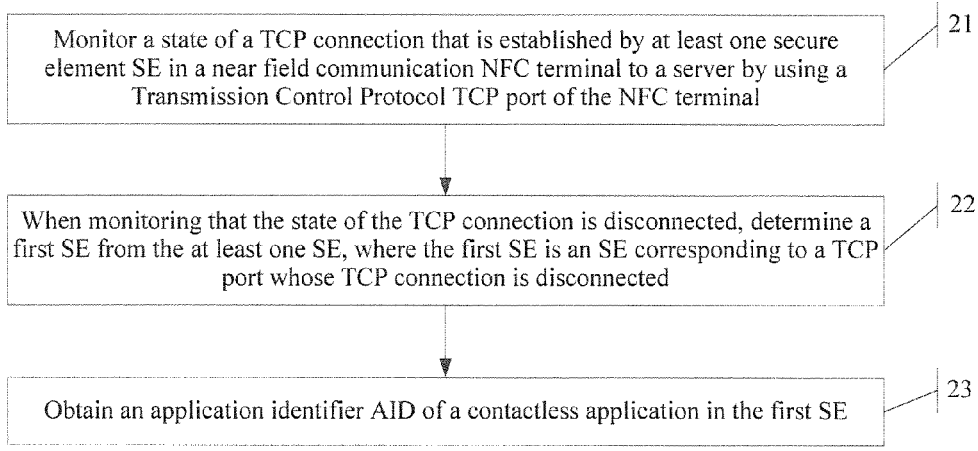
FIG. 2 is a flowchart of an information processing method according to Embodiment 1 of the present invention.

Referring to FIG. 2, FIG. 2 is a flowchart of an information processing method according to Embodiment 1 of the present invention. The method includes the following steps:

Step 21: Monitor a state of a TCP connection that is established by at least one secure element SE in a near field communication NFC terminal to a server by using a Transmission Control Protocol TCP port of the NFC terminal.

Step 22: When monitoring that the state of the TCP connection is disconnected, determine a first SE from the at least one SE, where the first SE is an SE corresponding to a TCP port whose TCP connection is disconnected.

Step 23: Obtain an application identifier AID of a contactless application in the first SE.

Specifically, at least one SE is installed in the NFC terminal. Each SE establishes a TCP connection to one server by using one TCP port in the NFC terminal. Multiple SEs may successively establish TCP connections to servers by using a same TCP port. Different SEs establish TCP connections to different servers, and the SEs communicate with the servers by using the TCP connections. A remote server sends a content management command, for example, a command for installing a contactless application or a command for updating a configuration parameter of an application, to the SE by using a TCP connection. Then, the SE executes the received command, and in a particular configuration, sends command execution success acknowledgement information to the remote server, and then disconnects from the server. Objectively, establishment or disconnection of a connection, in particular, the disconnection, is related to installation of a new application in the SE or a change of an application state. Therefore, a DH of the NFC terminal may monitor a state of a TCP connection. When the state of the TCP connection is disconnected, it indicates that a contactless application is newly installed in an SE corresponding to a TCP port whose TCP connection is disconnected, or it indicates that a lifecycle state of a contactless application in an SE corresponding to a TCP port whose TCP connection is disconnected changes. For convenience of description, the SE corresponding to the TCP port whose TCP connection is disconnected is referred to a first SE.

When the DH monitors that the state of the TCP connection is disconnected, because the SE establishes the TCP connection to the server by using a preset TCP port number, an identifier SE ID of the first SE may be determined according to a correspondence between the preset TCP port number and the SE, where the SE ID refers to an ID that is allocated by the NFCC to each SE, and herein the SE ID is equivalent to an NFC execution environment NFCEE ID in the NFC Forum specification.

When different SEs in the NFC terminal are connected to a remote server by using a same TCP port, the identifier SE ID of the first SE may also be determined according to a correspondence among the preset TCP port number, an Internet Protocol (English: Internet Protocol, IP for short) address of the remote server, and an SE. An IP address of a server is acquired and saved in an initiation process that is performed by the NFC terminal when the NFC terminal activates an SE for the first time.

Similarly, when a program but not an SE in a terminal uses a monitored port number, a monitor program may check whether an IP address of a remote server that establishes a connection by using the port number is consistent with a remote server IP address that is parsed out during SE initiation, and then may eliminate interference. In this case, no SE communicates with the remote server.

Figure 3:
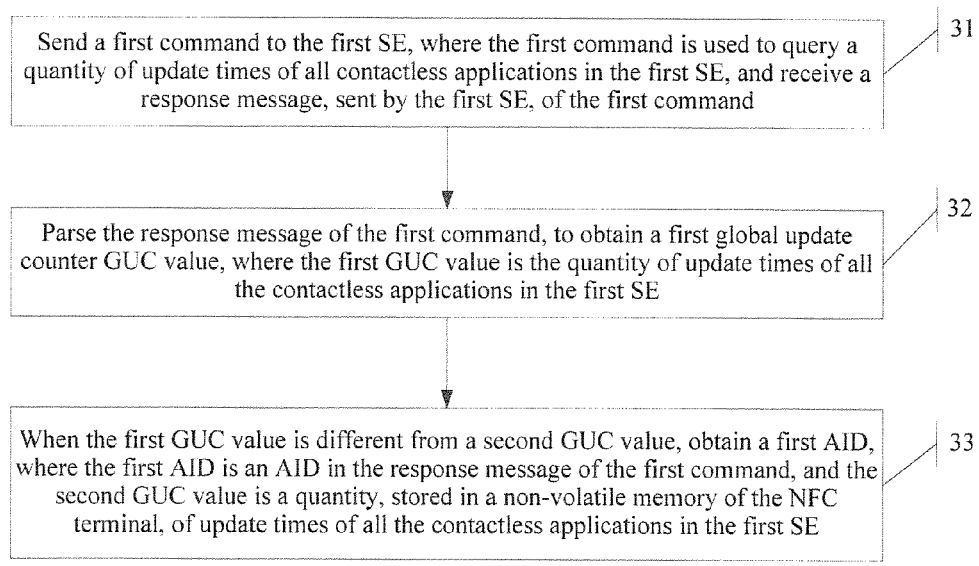
FIG. 3 is a flowchart of a method for obtaining an application identifier AID of a contactless application in a first SE according to Embodiment 1 of the present invention.

After the first SE is determined, the application identifier AID of the contactless application in the first SE may be obtained in the following two manners:

First manner: Referring to FIG. 3, FIG. 3 is a flowchart of a method for obtaining the application identifier AID of the contactless application in the first SE according to Embodiment 1 of the present invention. The method includes the following steps:

Step 31: Send a first command to the first SE, where the first command is used to query a quantity of update times of all contactless applications in the first SE, and receive a response message, sent by the first SE, of the first command.

Step 32: Parse the response message of the first command, to obtain a first global update counter GUC value, where the first GUC value is the quantity of update times of all the contactless applications in the first SE.

Step 33: When the first GUC value is different from a second GUC value, obtain a first AID, where the first AID is an AID in the response message of the first command, and the second GUC value is a quantity, stored in a non-volatile memory of the NFC terminal, of update times of all the contactless applications in the first SE.

Figure 4:
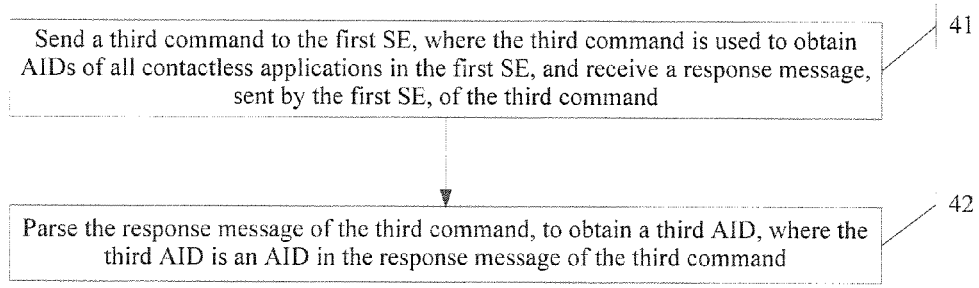
FIG. 4 is a flowchart of another method for obtaining an application identifier AID of a contactless application in a first SE according to Embodiment 1 of the present invention.

Second manner: Referring to FIG. 4, FIG. 4 is a flowchart of another method for obtaining the application identifier AID of the contactless application in the first SE according to Embodiment 1 of the present invention. The method includes the following steps:

Step 41: Send a third command to the first SE, where the third command is used to obtain AIDs of all contactless applications in the first SE, and receive a response message, sent by the first SE, of the third command.

Step 42: Parse the response message of the third command, to obtain a third AID, where the third AID is an AID in the response message of the third command.

The following first describes the first manner in detail.

After the first SE is determined, a SELECT CRS APP command needs to be sent to the first SE first, where a CRS (English: Contactless Registry Service, Chinese: contactless registry service) APP is a management application in the SE. The Global Platform defines that an AID of the CRS application is 'A00000015143525300'. Therefore, a SELECT 'A00000015143525300' command is sent to the SE corresponding to the TCP port whose TCP connection is disconnected. A format of the SELECT CRS APP command is shown in Table 1.

More specifically, a CRS refers to a function provided by software in the SE, and is configured to manage actions related to a contactless application such as installation, update, deletion, activation, deactivation, and priority change, and a contactless communications protocol related to an application; the CRS further includes an application programming interface (English: Application Programming Interface, Chinese: API) that is provided to an authorized entity and that is related to the foregoing function. An entity outside the SE accesses the CRS function by using the CRS application (CRS APP).

TABLE 1

| SELECT CRS APP command | | | | | |
|---|---|---|---|---|---|
| Command header | | | | | Command Data |
| CLA | INS | P1 | P2 | Lc | AID |
| '80' | 'A4' | '04' | '00' | '09' | 'A0' '00' '00' '01' '51' '43' '52' '53' '00' |

The first SE sends a response message of the SELECT CRS APP command to the DH, and the DH determines whether the received response message of the SELECT CRS APP command is correct. If the response message is correct, the DH determines to select the CRS application. A format of the response message of the SELECT CRS APP command is shown in Table 2.

TABLE 2

| Response message of the SELECT CRS APP command | | |
|---|---|---|
| Data Field | Status Bytes | |
| FCI | SW1 | SW2 |
| FCI Template TLV | '90' | '00' |

A response is considered to be correct only if status words SW1 and SW2 are "9000". Otherwise, if the status words are other values, that is, other values that are not "9000", it indicates that the response of the command is abnormal, and troubleshooting is performed.

After the CRS application is selected, step 31 may be performed: Send a first command to the first SE, where the first command is used to query a quantity of update times of all contactless applications in the first SE, and receive a response message, sent by the first SE, of the first command. That is, the DH sends the first command to the first SE, where the first command is used to query the quantity of update times of all the contactless applications in the first SE.

TABLE 3

| GET DATA command | | |
|---|---|---|
| Code | Value | Meaning |
| CLA | '80' | |
| INS | 'CA' | GET DATA |
| P1 | '00' | P1 value |
| P2 | 'A5' | P2 value |
| Le | '00' | |

TABLE 4

| Response message of the GET DATA command | | | | |
|---|---|---|---|---|
| | | | | Value Description |
| | | | | FCI Propiretatry Telemplate |
| Tag | Length | Tag | Length | Value Description |
| 'A5' | Var | '9F08' | 2 | Version number (2 bytes), Value '01' '00' |
| | | '80' | 2 | Global Update Counter (big Endian) |
| | | 'xx' | Var | The number of APPs installed after SE responding to the last GET DATA commomand and APPs whose state have been changed |
| | | '4F' | 5-16 | First AID |
| | | '4F' | 5-16 | Second AID |
| | | '4F' | 5-16 | ... |
| | | '4F' | 5-16 | The nth AID |

The first command may be a GET DATA command, and the response message of the first command may be a response message of the GET DATA command. It should be noted that, the first command is not limited to the GET DATA command, and the response message of the first command is not limited to the response message of the GET DATA command.

An example in which the first command is the GET DATA command is used, and then the response message of the first command is the response message of the GET DATA command. Specifically, an operating system in the first SE distributes the GET DATA command to the CRS application in the first SE, and the CRS application generates the response message of the GET DATA command, and sends the response message to the DH. A format of the GET DATA command is shown in Table 3, and a format of the response message of the GET DATA command is shown in Table 4.

In this embodiment of the present invention, a response message of a GET DATA command in the prior art is extended, where a format of the response message of the GET DATA command in the prior art is shown in Table 5.

TABLE 5

| Response message of the GET DATA command in the prior art | | | | |
|---|---|---|---|---|
| | | | | Value Description |
| | | | | FCI Propiretatry Telemplate |
| Tag | Length | Tag | Length | Value Description |
| 'A5' | Var | '9F08' | 2 | Version number (2 bytes), Value '01' '00' |
| | | '80' | 2 | Global Update Counter (big Endian) |

It can be known from comparison with Table 5 that, in Table 4, at least one AID quantity TLV (Tag: 'xx', Length: Var, Value Description: The number of APPs installed after SE responding to the last GET DATA command and APPs whose state have been changed) is added, to notify the DH that sends the GET DATA command of a quantity of contactless applications that are newly installed in the first SE and a quantity of contactless applications whose application states have changed in the first SE before the first SE receives the GET DATA command. If the quantity of contactless applications that are newly added and the quantity of contactless applications whose application states have changed are greater than 0, the AID quantity TLV needs to be followed by at least one AID TLV. Specifically, after the AID quantity TLV, AIDs of the first contactless application, the second contactless application, . . . , and the $n^{th}$ contactless application that are in the SE and that are newly installed or whose application states have changed are successively listed.

A TLV (English: Type-Length-Value, Chinese: type-length-value triplet) is a structure that is used when information transmission is performed by using an APDU, and includes a Tag/Type field of a fixed length, a Length field of a fixed length, and a Value field of a variable length, and a TLV format complies with the ISO/IEC 8825-1:2002 standard.

In the SE, there is also a contactless registry event listener (English: Contactless Registry Event Listener, CREL for short). The CREL refers to software in the SE, and is configured to listen to a state change of an associated contactless application, where the state change includes update, deletion, activation, deactivation, or the like of the application. For each contactless application installed into the SE, one CREL application needs to be set during the installation. A function of the CREL application is to monitor a state change of the contactless application, so that when the server manages the contactless application; therefore, when the application state changes, invocation of the CREL application is triggered, an AID of the contactless application and the change of the application state are recorded in the CREL;

and when the response message of the GET DATA command is constructed, data recorded in the CREL is read. In Embodiment 1 of the present invention, only the AID is read. Certainly, the AID and an operation type for each AID may also be read, for example, application installation, deletion, or configuration modification.

After receiving the response message of the first command, the DH may perform step 32: Parse the response message of the first command, to obtain a first global update counter GUC value, where the first GUC value is the quantity of update times of all the contactless applications in the first SE.

An example in which the first command is the GET DATA command is still used, and then the response message of the first command is the response message of the GET DATA command. Specifically, in Table 4, there is a global update counter (English: Global Update Counter, GUC for short) value. Therefore, the response message of the GET DATA command is parsed, and then a global update counter GUC value of the first SE maybe obtained. For convenience of description, the GUC value of the first SE is referred to as the first GUC value. A GUC is configured to identify a quantity of update times of all contactless applications in an SE. When an application state of any contactless application changes (application installation, deletion, configuration modification, or the like), or a contactless application is updated, an operation of increasing by 1 is performed on the counter.

Then, the first GUC value is compared with a GUC value that is of the first SE and that is stored in the non-volatile memory of the NFC terminal. For convenience of description, the GUC value that is of the first SE and that is stored in the non-volatile memory of the NFC terminal is referred to as the second GUC value, where the GUC value stored in the non-volatile memory is initiated when the SE is activated for the first time, and is updated according to the response message of the GET DATA command each time when the GET DATA command is invoked.

Next, step 33 is performed: When the first GUC value is different from a second GUC value, obtain a first AID, where the first AID is an AID in the response message of the first command, and the second GUC value is a quantity, stored in a non-volatile memory of the NFC terminal, of update times of all the contactless applications in the first SE. That is, if the obtained GUC value is different from the stored GUC value, the AID in the response message of the first command is obtained.

An example in which the first command is the GET DATA command is still used, and then the response message of the first command is the response message of the GET DATA command. Specifically, the response message of GET DATA command shown in Table 4 includes AIDs whose application states have changed in the first SE, that is, AIDs whose configurations are modified or that are newly installed. Therefore, the AID that is obtained herein and that is carried in the response message of the GET DATA command is not equal to all AIDs in the first SE.

Figure 5:
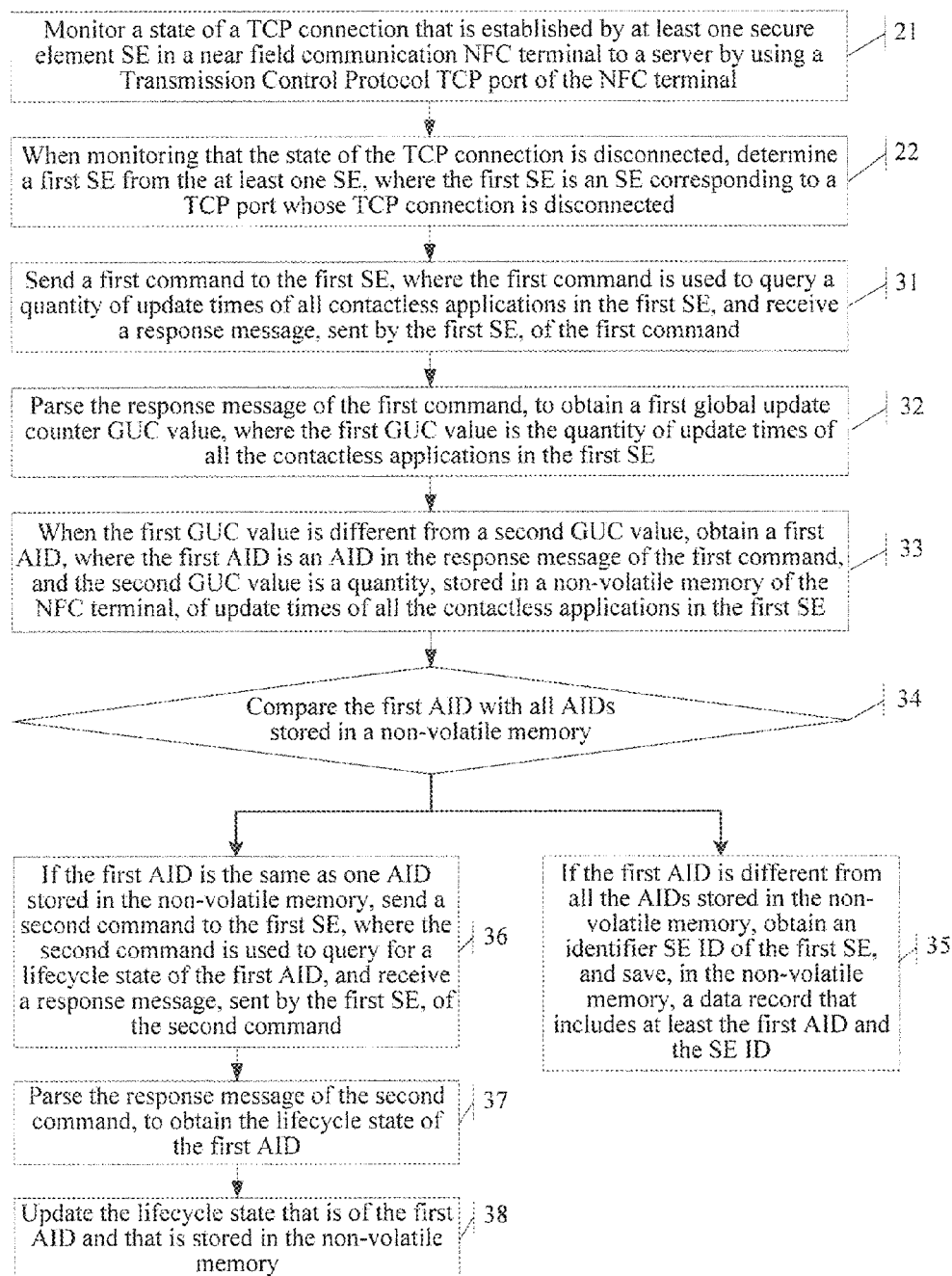
FIG. 5 is a detailed flowchart of an information processing method in which a first manner is used according to Embodiment 1 of the present invention.

Referring to FIG. 5, FIG. 5 is a detailed flowchart of the information processing method in which the first manner is used according to Embodiment 1 of the present invention. The method includes step 21 and step 22, and step 31 to step 38. As shown in FIG. 5, after step 33 is performed to obtain the first AID, step 34 may be performed: Compare the first AID with all AIDs stored in a non-volatile memory.

An example in which the first command is the GET DATA command is still used, and then the response message of the first command is the response message of the GET DATA command. Specifically, there is the first AID in the response message of the GET DATA command. Therefore, the first AID is compared with all the AIDs stored in the non-volatile memory, to determine whether the first AID is a newly added AID or an AID that is already installed and whose state is updated. For an AID that is newly added, a record is added to an AID list of the NFC terminal. For an AID that is not newly added, that is, an AID that is already installed and whose state is updated, a lifecycle state is queried.

After step 34 is performed, step 35 or step 36 to step 38 may be performed according to a comparison result.

Step 35: If the first AID is different from all the AIDs stored in the non-volatile memory, obtain an identifier SE ID of the first SE, and save, in the non-volatile memory, a data record that includes at least the first AID and the SE ID.

Step 36: If the first AID is the same as one AID stored in the non-volatile memory, send a second command to the first SE, where the second command is used to query a lifecycle state of the first AID, and receive a response message, sent by the first SE, of the second command.

Step 37: Parse the response message of the second command, to obtain the lifecycle state of the first AID.

Step 38: Update the lifecycle state that is of the first AID and that is stored in the non-volatile memory.

An example in which the first command is the GET DATA command is still used, and then the response message of the first command is the response message of the GET DATA command. Specifically, the response message of the GET DATA command may include M AIDs, where M is an integer greater than or equal to 1. Assume that m is 1 to M successively. An $m^{th}$ AID in the response message of the GET DATA command is used as the first AID, and the first AID is compared with all the AIDs stored in the non-volatile memory.

In a process in which the first AID is compared with all the AIDs stored in the non-volatile memory, if the first AID is different from all the AIDs stored in the non-volatile memory, it indicates that the first AID is not stored in the non-volatile memory, and the first AID is a newly added AID.

In Embodiment 1 of the present invention, for the newly added AID, a data record for the newly added AID and the SE ID of the first SE needs to be stored in the non-volatile memory. A quantity of data records that need to be stored needs to be equal to a quantity of newly added AIDs in the response message of the GET DATA command. The first AID is a newly added AID, and therefore a data record for the first AID and the SE ID of the first SE is stored in the non-volatile memory.

In a process in which the first AID is compared with all the AIDs stored in the non-volatile memory, if the first AID is the same as one AID stored in the non-volatile memory, it indicates that the first AID is already stored in the non-volatile memory, and the first AID is an AID whose application state is updated.

In Embodiment 1 of the present invention, for the AID whose application state is updated, the second command needs to be sent to the first SE, where the second command is used to query the lifecycle state of the first AID.

The second command may be a GET STATUS command in a first format, and the response message of the second command may be a response message of the GET STATUS command in the first format. It should be noted that, the second command is not limited to the GET STATUS command in the first format, and the response message of the second command is not limited to the response message of the GET STATUS command in the first format.

An example in which the second command is the GET STATUS command in the first format is used, and then the response message of the second command is the response message of the GET STATUS command in the first format. A format of the GET STATUS command in the first format is shown in Table 6, and a format of the response message of the GET STATUS command in the first format is shown in Table 7.

TABLE 6

GET STATUS command in the first format

| Command header | | | | | Command Data |
|---|---|---|---|---|---|
| CLA | INS | P1 | P2 | Lc | Search on: Specific AIDs |
| '80' | 'F2' | '4F' | '00' | '0#' | '4F' '##' 'XXXX' |

TABLE 7

Response message of the GET STATUS command in the first format

| | | Value Description Application Template | | |
|---|---|---|---|---|
| Tag | Length | Tag | Length | Value Description |
| '61' | 7-n | '4F' | 7-16 | Application AID |
| | | '9F70' | 2 | Application Lifecycle State |

In Table 6, 'XXXX' represents the first AID. '##' represents a length of the first AID. In Table 7, Application AID is the first AID included in the GET STATUS command in the first format, and Application Lifecycle State is the lifecycle state of the first AID included in the GET STATUS command in the first format.

The first AID is an AID whose application state is updated. Therefore, the GET STATUS command in the first format is sent to the first SE, the first AID is filled in 'XXXX', and the response message of the GET STATUS command in the first format is received. Application AID is the first AID, and Application Lifecycle State is the lifecycle state of the first AID.

The lifecycle state includes: installed (installed), locked (locked), selectable (selectable), and app specific (application specific). In Embodiment 1 of the present invention, it is considered that installed and locked are abnormal states, and selectable and app specific are normal states.

An example in which the second command is the GET STATUS command in the first format is still used, and then the response message of the second command is the response message of the GET STATUS command in the first format. After the response message of the GET STATUS command in the first format is parsed, to obtain a lifecycle state of each AID of AIDs whose application states are updated, the lifecycle state of the AID whose application state is updated is compared with a lifecycle state that is of an AID whose application state is not yet updated and that is already stored in the non-volatile memory. If the lifecycle states are different, the lifecycle state of the AID is updated to a lifecycle state in the response message of the GET STATUS command in the first format.

The first AID is an AID whose application state is updated. Therefore, the lifecycle state of the first AID may be obtained by parsing the response message of the GET STATUS command in the first format. Then, the lifecycle state of the first AID is compared with a lifecycle state that is of the first AID whose application state is not yet updated and that is already stored in the non-volatile memory. If the lifecycle states are different, the lifecycle state of the first AID is updated to the lifecycle state in the response message of the GET STATUS command in the first format.

In Embodiment 1 of the present invention, not only the lifecycle state of each AID of the AIDs whose application states are updated needs to be obtained, but also a lifecycle state of each AID of newly added AIDs needs to be obtained. In other words, for each AID of the newly added AIDs, the second command in the first format needs to be sent to the SE corresponding to the TCP port whose TCP connection is disconnected, and the response message of the second command needs to be received and parsed, to obtain the lifecycle state. In Embodiment 1 of the present invention, after the lifecycle state of each AID of the newly added AIDs is obtained, and the lifecycle state of the AID whose application state is updated is updated, the DH selects only an AID whose lifecycle state is a normal state to generate routing information, so that the DH configures a routing table for the NFCC in an appropriate occasion.

The appropriate occasion may be a time when a user selects and activates a contactless application by using a graphical user interface of a mobile phone. For example, when a user opens a mobile wallet application, and taps and selects a virtual bank card, an AID of the bank card application needs to be configured into an NFCC routing table, and the routing table needs to be reconfigured; or when an SE is removed, several AIDs become invalid, and an NFCC routing table needs to be refreshed, for example, when a user manually disables an SE in the body of a mobile phone, which causes an AID in the SE to be temporarily unavailable, it is necessary to refresh the routing table, and delete a routing item that is in the routing table and that corresponds to the AID in the disabled SE.

The following describes the second manner in detail.

After the first SE is determined, a SELECT CRS APP command needs to be sent to the first SE first. A format of the SELECT CRS APP command is shown in Table 1. The first SE sends a response message of the SELECT CRS APP command to the DH, and the DH determines whether the received response message of the SELECT CRS APP command is correct. If the response message is correct, the DH determines to select a CRS application. A format of the response message of the SELECT CRS APP command is shown in Table 2. A response is considered to be correct only if status words SW1 and SW2 are "9000". Otherwise, if the status words are other values, that is, other values that are not "9000", it indicates that the response of the command is abnormal, and troubleshooting is performed.

After the CRS application is selected, step 41 may be performed: Send a third command to the first SE, where the third command is used to obtain AIDs of all contactless applications in the first SE, and receive a response message, sent by the first SE, of the third command. That is, the DH sends a third command in a second format to the first SE, where the third command is used to obtain the AIDs of all the contactless applications in the first SE.

TABLE 8

GET STATUS command in the second format

| Command header | | | | | Command Data | |
| --- | --- | --- | --- | --- | --- | --- |
| | | | | | Search on: All | Return: AID/Update |
| CLA | INS | P1 | P2 | Lc | AIDs | Counter |
| '80' | 'F2' | '4F' | '00' | '0D' | '4F' '00' | '5C' '01' '80' |

TABLE 9

Response message of the GET STATUS command in the second format

| Data Field | | | Status bytes | |
| --- | --- | --- | --- | --- |
| Application Related Data | AID | Update Counter | SW1 | SW2 |
| '61##' | '4F' '##' 'xx . . . xx' ... ... '4F' '##' 'xx . . . xx' | '80' '02' 'xxxx' ... ... '80' '02' 'xxxx' | '90' | '00' |

The third command may be a GET STATUS command in a second format, and the response message of the third command may be a response message of the GET STATUS command in the second format. It should be noted that, the third command is not limited to the GET STATUS command in the second format, and the response message of the third command is not limited to the response message of the GET STATUS command in the second format.

An example in which the third command is the GET STATUS command in the second format is used, and then the response message of the third command is the response message of the GET STATUS command in the second format. Specifically, an operating system in the first SE distributes the GET STATUS command in the second format to the CRS application in the first SE, and the CRS application generates the response message of the GET STATUS command in the second format, and sends the response message to the DH. A format of the GET STATUS command in the second format is shown in Table 8, and a format of the response message of the GET STATUS command in the second format is shown in Table 9.

In Table 9, Data Field carries all AIDs in the first SE and an update counter (English: Update Counter, UC for short) value of each AID. When the status words SW1 and SW2 are "9000", it indicates that the response is correct, and when the status words SW1 and SW2 are not '9000', it indicates that an exception occurs.

After the DH receives the response message of the third command, step 42 may be performed: Parse the response message of the third command, to obtain a third AID, where the third AID is an AID in the response message of the third command.

An example in which the third command is the GET STATUS command in the second format is still used, and then the response message of the third command is the response message of the GET STATUS command in the second format. Specifically, the response message of the GET STATUS command in the second format shown in Table 9 includes all the AIDs in the first SE, where there are AIDs whose application states have changed, and there are also AIDs whose application states have not changed. Therefore, the AID that is obtained herein and that is carried in the response message of the GET STATUS command in the second format is all the AIDs in the first SE.

Figure 6:
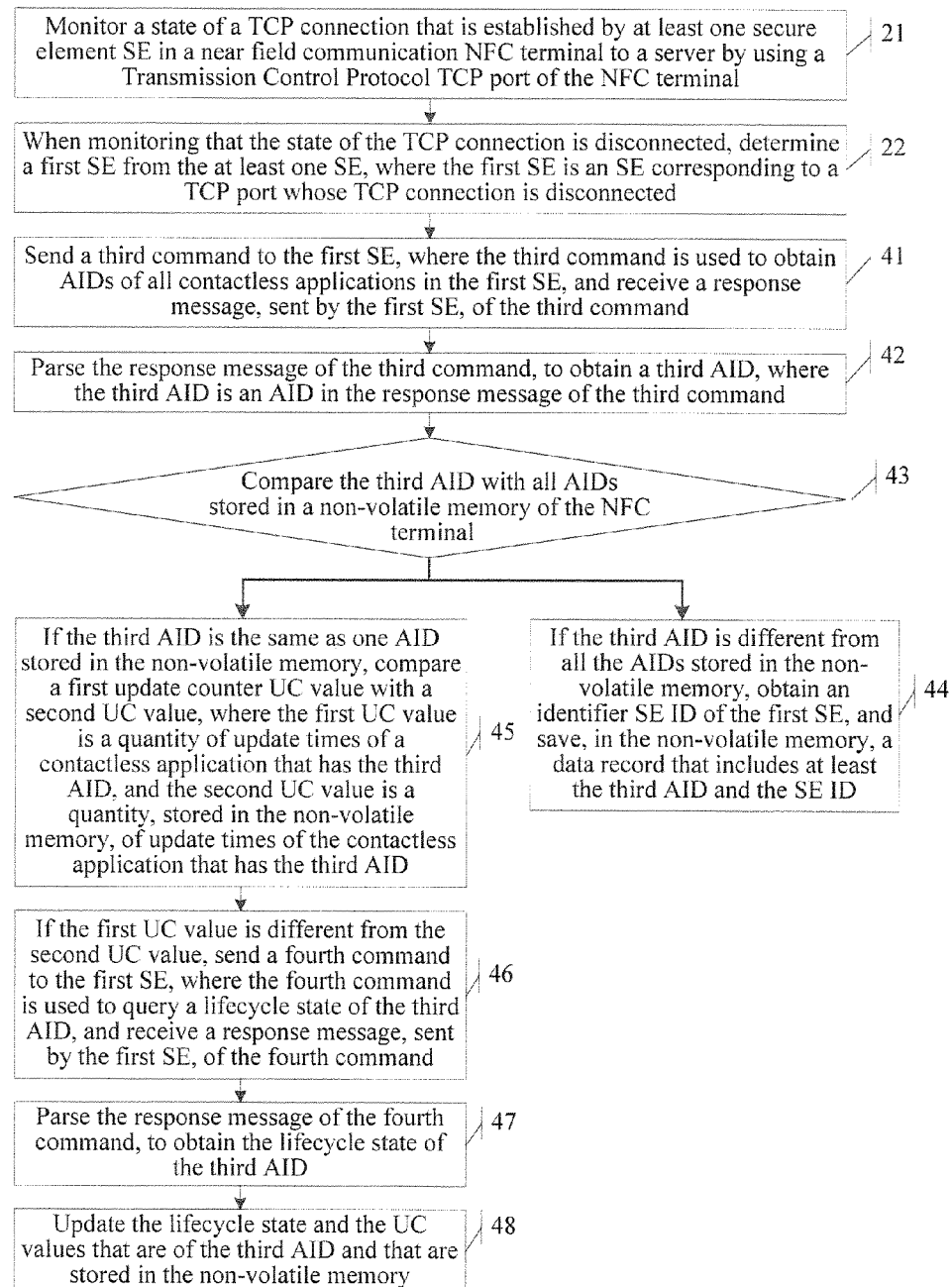
FIG. 6 is a detailed flowchart of an information processing method in which a first manner is used according to Embodiment 1 of the present invention.

Referring to FIG. 6, FIG. 6 is a detailed flowchart of the information processing method in which the second manner is used according to Embodiment 1 of the present invention. The method includes step 21 and step 22, and step 41 to step 48. As shown in FIG. 6, to distinguish which AIDs in the obtained AIDs are newly added AIDs, and which AIDs are AIDs whose application states are updated, step 43 needs to be performed: Compare the third AID with all AIDs stored in a non-volatile memory of the NFC terminal.

An example in which the third command is the GET STATUS command in the second format is still used, and then the response message of the third command is the response message of the GET STATUS command in the second format. Specifically, there is the third AID in the response message of the GET STATUS command in the second format. Therefore, the third AID is compared with all the AIDs stored in the non-volatile memory, to determine whether the third AID is a newly added AID or an AID that is already installed and whose state is updated. For an AID that is newly added, a record is added to an AID list of the NFC terminal. For an AID that is not newly added, that is, an AID that is already installed and whose state is updated, a lifecycle state is queried with reference to a UC value, and the UC value is updated.

After step 43 is performed, step 44 or step 45 to step 48 may be performed according to a comparison result.

Step 44: If the third AID is different from all the AIDs stored in the non-volatile memory, obtain an identifier SE ID of the first SE, and save, in the non-volatile memory, a data record that includes at least the third AID and the SE ID.

Step 45: If the third AID is the same as one AID stored in the non-volatile memory, compare a first update counter UC value with a second UC value, where the first UC value is a quantity of update times of a contactless application that has the third AID, and the second UC value is a quantity, stored in the non-volatile memory, of update times of the contactless application that has the third AID.

Step 46: If the first UC value is different from the second UC value, send a fourth command to the first SE, where the fourth command is used to query a lifecycle state of the third AID, and receive a response message, sent by the first SE, of the fourth command.

Step 47: Parse the response message of the fourth command, to obtain the lifecycle state of the third AID.

Step 48: Update the lifecycle state and the UC values that are of the third AID and that are stored in the non-volatile memory.

An example in which the third command is the GET STATUS command in the second format is still used, and then the response message of the third command is the response message of the GET STATUS command in the second format. Specifically, the response message of the GET STATUS command in the second format includes M AIDs, where M is an integer greater than or equal to 1. Assume that m is equal to 1 to M successively. An $m^{th}$ AID in the response message of the GET STATUS command in the second format is used as the third AID, and the third AID is compared with all the AIDs stored in the non-volatile memory.

In a process in which the third AID is compared with all the AIDs stored in the non-volatile memory, if the third AID is different from all the AIDs stored in the non-volatile memory, it indicates that the third AID is not stored in the non-volatile memory, and the third AID is a newly added AID.

In Embodiment 1 of the present invention, for the newly added AID, a data record for the newly added AID and the SE ID of the first SE needs to be stored in the non-volatile memory. There is a UC value of each AID in the response message of the GET STATUS command in the second format. Therefore, a UC value of a newly added AID may be further stored in a data record, so as to monitor a change of an application state of a contactless application that has an AID. A quantity of data records that need to be stored needs to be equal to a quantity of newly added AIDs in the response message of the GET STATUS command in the second format. The third AID is a newly added AID, and therefore a data record for the third AID and the SE ID of the first SE is stored in the non-volatile memory. Certainly, a UC value of the third AID may be further stored in the data record, so as to monitor a change of an application state of the contactless application that has the third AID.

In a process in which the third AID is compared with all the AIDs stored in the non-volatile memory, if the third AID is the same as one AID stored in the non-volatile memory, it indicates that the third AID is already stored in the non-volatile memory, and the third AID is an AID whose application state is updated.

In Embodiment 1 of the present invention, when the third AID is an AID whose application state is updated, the UC value of the third AID needs to be compared with a UC value that is of the third AID and that is stored in the non-volatile memory. If the UC values are different, the fourth command is sent to the first SE, where the fourth command is used for the lifecycle state of the third AID, the response message of the fourth command is received and parsed, and then the lifecycle state of the third AID whose application state is updated and whose UC value is different from the UC value in the non-volatile memory is obtained.

The fourth command may be a GET STATUS command in a first format, and the response message of the fourth command may be a response message of the GET STATUS command in the first format. It should be noted that, the fourth command is not limited to the GET STATUS command in the first format, and the response message of the fourth command is not limited to the response message of the GET STATUS command in the first format. A format of the GET STATUS command in the first format is shown in Table 6, and a format of the response message of the GET STATUS command in the first format is shown in Table 7.

An example in which the fourth command is the GET STATUS command in the first format is used, and then the response message of the fourth command is the response message of the GET STATUS command in the first format. Specifically, the third AID is an AID whose application state is updated and whose UC value is different from the UC value in the non-volatile memory. Therefore, the GET STATUS command in the first format is sent to the first SE, the third AID is filled in 'XXXX', and the response message of the GET STATUS command in the first format is received. Application AID is the third AID, and Application Lifecycle State is the lifecycle state of the third AID.

An example in which the fourth command is the GET STATUS command in the first format is used, and then the response message of the fourth command is the response message of the GET STATUS command in the first format. Specifically, after the response message of the GET STATUS command in the first format is parsed, to obtain a lifecycle state of each AID of AIDs whose application states are updated, the lifecycle state of the AID whose application state is updated is compared with a lifecycle state that is of an AID whose application state is not yet updated and that is already stored in the non-volatile memory. If the lifecycle states are different, the lifecycle state of the AID is updated to a lifecycle state in the response message of the GET STATUS command in the first format, and a UC value of the AID is updated to a UC value in the response message of the GET STATUS command in the first format; or if the lifecycle states are the same, only a UC value of the AID is updated to a UC value in the response message of the GET STATUS command in the first format.

The third AID is an AID whose application state is updated and whose UC value is different from the UC value in the non-volatile memory. Therefore, the lifecycle state of the third AID may be obtained by parsing the response message of the GET STATUS command in the first format, and then the lifecycle state of the third AID is compared with a lifecycle state that is of the third AID whose application state is not yet updated and that is stored in the non-volatile memory. If the lifecycle states are different, the lifecycle state of the third AID is updated to a lifecycle state in the response message of the GET STATUS command in the first format, and the UC value of the third AID is updated to a UC value in the response message of the GET STATUS command in the first format; or if the lifecycle states are the same, only the UC value of the third AID is updated to a UC value in the response message of the GET STATUS command in the first format.

In Embodiment 1 of the present invention, not only the lifecycle state of each AID of the AIDs whose application states are updated needs to be obtained, but also a lifecycle state of each AID of newly added AIDs, and a lifecycle state of an AID whose UC value is different from the UC value in the non-volatile memory need to be obtained. In other words, for each AID of the newly added AIDs, and each AID whose UC value is different from the UC value in the non-volatile memory, the GET STATUS command in the first format needs to be sent to the first SE, and the response message of the GET STATUS command in the first format needs to be received and parsed, to obtain a lifecycle state. The format of the GET STATUS command in the first format is shown in Table 6, and the format of the response message of the GET STATUS command in the first format is shown in Table 7.

In Embodiment 1 of the present invention, after the lifecycle state of each AID of the newly added AIDs, and the lifecycle state of each AID whose UC value is different from the UC value in the non-volatile memory are obtained, the DH selects only an AID whose lifecycle state is a normal state to generate routing information, so that the DH configures a routing table to the NFCC in an appropriate occasion.

Embodiment 2

In this embodiment of the present invention, when an SE in an NFC terminal completes installation or configuration modification of a contactless application, for example, a user uses the NFC terminal to select a card application on a mobile wallet interface, and performs an operation such as installation, update, or deletion on the card, after the SE correspondingly executes a command of contactless application installation, lifecycle state modification, deletion, or the like, the SE generally needs to report a command execution success message to a server. After the server receives the command execution success message, and learns that a contactless application is successfully installed or an application state of a contactless application is updated, the server pushes an application change notification message to a DH of the NFC terminal.

Figure 7:
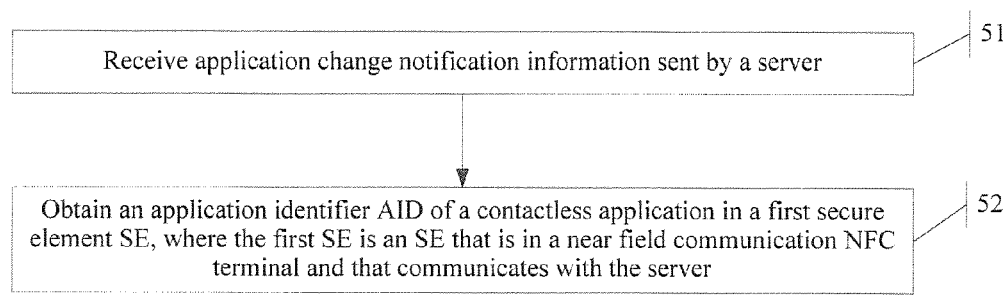
FIG. 7 is another flowchart of an information processing method according to Embodiment 2 of the present invention.

Referring to FIG. 7, FIG. 7 is another flowchart of an information processing method according to Embodiment 2 of the present invention. The method includes the following steps:

Step 51: Receive application change notification information sent by a server.

Step 52: Obtain an application identifier AID of a contactless application in a first secure element SE, where the first SE is an SE that is in a near field communication NFC terminal and that communicates with the server.

In this embodiment of the present invention, the application change notification message received by the DH of the NFC terminal has multiple forms.

First form: When the server pushes the application change notification message to the DH of the NFC terminal by using an HTTP message, the application change notification message includes at least three tags: a message type, an AID of a newly installed contactless application or an AID of a contactless application whose application state is updated, and an SE ID of an SE in which a newly installed contactless application or a contactless application whose application state is updated is located. A specific format is as follows:

```
<ServiceDescriptor>
    <AID>xx..xx</AID>
    <SEID>xxx..xxx</SEID>
</ServiceDescriptor>
```

Second form: The application change notification message includes only a sending source, that is, an IP address of the server that sends the application change notification message, and an SE in which a contactless application is newly installed or an application state of a contactless application is updated may be determined according to a correspondence between the IP address of the server and the SE.

After step 51 is performed and the application change notification message sent by the server is received, the first SE may be determined first, that is, an SE that is in the near field communication NFC terminal and that communicates with the server. Specifically, the SE that communicates with the server, that is, the SE that reports the command execution success message to the server, is determined by parsing the application change notification message is parsed, or by using the application change notification message and the correspondence between the IP address of the server and the SE. It is considered that, a contactless application is newly installed in the SE that communicates with the server, or an application state of a contactless application in the SE that communicates with the server changes.

After the first SE is determined, step 52 is performed. In Embodiment 2 of the present invention, according to different forms of the application change notification message, step 52 has at least the following three specific implementation manners:

a first specific implementation manner: parsing the application change notification information, to obtain an AID in the application change notification information;

a second specific implementation manner: sending a first command to the first SE, where the first command is used to query a quantity of update times of all contactless applications in the first SE, and receiving a response message, sent by the first SE, of the first command; parsing the response message of the first command, to obtain a first global update counter GUC value, where the first GUC value is the quantity of update times of all the contactless applications in the first SE; and when the obtained first GUC value is different from a second GUC value, obtaining a first AID, where the first AID is an AID in the response message of the first command, and the second GUC value is a quantity, stored in a non-volatile memory of the NFC terminal, of update times of all the contactless applications in the first SE; and a third implementation manner:

sending a third command to the first SE, where the third command is used to obtain AIDs of all contactless applications in the first SE, and receiving a response message, sent by the first SE, of the third command; and parsing the response message of the third command, to obtain a third AID, where the third AID is an AID in the response message of the third command.

The following first describes the first specific implementation manner in detail.

When the application change notification message is in the foregoing first form, the application change notification message maybe directly parsed, and then an AID in the first SE can be obtained. The application change notification information embodies only an AID whose application state changes. Therefore, only some AIDs, that is, a newly added AID and an AID whose lifecycle state is updated, in the first SE are obtained herein, and all AIDs in the first SE are not obtained.

When the application change notification message is in the foregoing second form or the foregoing third form, the SE that communicates with the server may be equivalent to the SE corresponding to the TCP port whose TCP connection is disconnected in Embodiment 1. The first command is sent, to obtain the AID in the response message of the first command, or the third command is sent, to obtain the AID in the response message of the third command.

For details, refer to related descriptions in Embodiment 1. Details are not described herein again.

The application change notification message includes AIDs whose application states have changed in the first SE, that is, AIDs whose configurations are modified or that are newly installed, but not all the AIDs in the first SE. Therefore, after the AID in the application change notification information is obtained, the following steps may be further performed:

comparing the first AID with all AIDs stored in the non-volatile memory; and if the first AID is different from all the AIDs stored in the non-volatile memory, obtaining an identifier SE ID of the first SE, and saving, in the non-volatile memory, a data record that includes at least the first AID and the SE ID; or if the first AID is the same as one AID stored in the non-volatile memory, sending a second command to the first SE, where the second command is used to query a lifecycle state of the first AID, and receiving a response message, sent by the first SE, of the second command;

parsing the response message of the second command, to obtain the lifecycle state of the first AID; and updating the lifecycle state that is of the first AID and that is stored in the non-volatile memory.

For a specific implementation manner, refer to related descriptions in Embodiment 1. Details are not described herein again.

Similarly, the response message of the first command includes AIDs whose application states have changed in the first SE, that is, AIDs whose configurations are modified or that are newly installed. The AIDs carried in the response message of the first command are not equal to all the AIDs in the first SE. Therefore, after the first AID is obtained, the following steps may be further performed:

comparing the first AID with all AIDs stored in the non-volatile memory; and if the first AID is different from all the AIDs stored in the non-volatile memory, obtaining an identifier SE ID of the first SE, and saving, in the non-volatile memory, a data record that includes at least the first AID and the SE ID; or if the first AID is the same as one AID stored in the non-volatile memory, sending a second command to the first SE, where the second command is used to query a lifecycle state of the first AID, and receiving a response message, sent by the first SE, of the second command;

parsing the response message of the second command, to obtain the lifecycle state of the first AID; and updating the lifecycle state that is of the first AID and that is stored in the non-volatile memory.

For details, refer to related descriptions in Embodiment 1. Details are not described herein again.

The response message of the third command includes all the AIDs in the first SE, including AIDs whose application states have changed, and AIDs whose application states have not changed. Therefore, after the third AID is obtained, the following steps may be further performed:

if the third AID is different from all the AIDs stored in the non-volatile memory, obtaining an identifier SE ID of the first SE, and saving, in the non-volatile memory, a data record that includes at least the one AID that participates in the comparison and the SE ID; or if the third AID is the same as one AID stored in the non-volatile memory, comparing a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, sending a fourth command to the first SE, where the fourth command is used to query a lifecycle state of the third AID, and receiving a response message, sent by the first SE, of the fourth command;

parsing the response message of the fourth command, to obtain the lifecycle state of the third AID; and updating the lifecycle state and the UC values that are of the third AID and that are stored in the non-volatile memory.

For a specific implementation manner, refer to related descriptions in Embodiment 1. Details are not described herein again.

Embodiment 3

Figure 8:
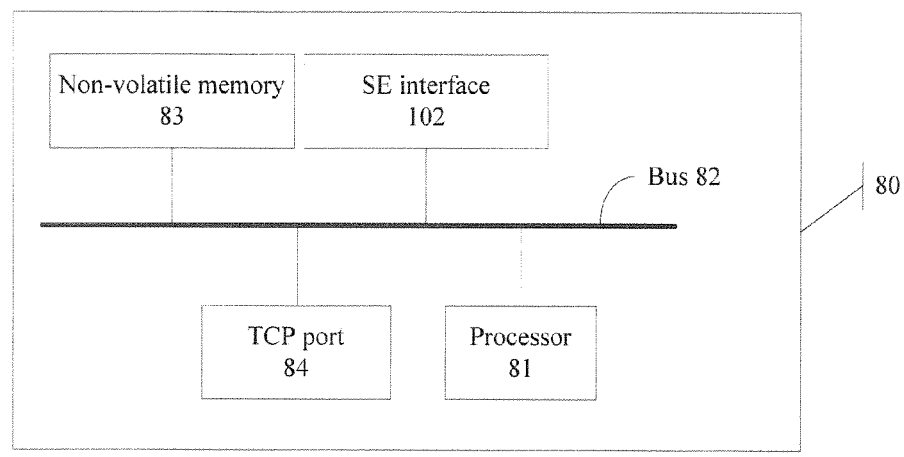
FIG. 8 is a schematic structural diagram of an NFC terminal according to Embodiment 3 of the present invention.

Based on a same invention conception, this embodiment of the present invention provides an NFC terminal. Referring to FIG. 8, FIG. 8 is a schematic structural diagram of an NFC terminal according to Embodiment 3 of the present invention. The NFC terminal 80 includes: a processor 81, a bus 82, a non-volatile memory 83, a secure element SE interface 102, and a Transmission Control Protocol TCP port 84.

The non-volatile memory 83 is configured to store an application identifier AID of a contactless application in the SE;

the secure element SE interface 102 is configured to connect the SE to the NFC terminal;

the Transmission Control Protocol TCP port 84; and a processor 81 is connected to the non-volatile memory 83, the SE interface 102, and the TCP port 84 by using the bus, and configured to:

monitor a state of a TCP connection that is established by at least one secure element SE in a near field communication NFC terminal to a server by using a Transmission Control Protocol TCP port of the NFC terminal;

when monitoring that the state of the TCP connection is disconnected, determine a first SE from the at least one SE, where the first SE is an SE corresponding to a TCP port whose TCP connection is disconnected; and obtain an application identifier AID of a contactless application in the first SE.

Optionally, the processor 81 is further configured to:

send a first command to the first SE, where the first command is used to query a quantity of update times of all contactless applications in the first SE, and receive a response message, sent by the first SE, of the first command;

parse the response message of the first command, to obtain a first global update counter GUC value, where the first GUC value is the quantity of update times of all the contactless applications in the first SE; and when the first GUC value is different from a second GUC value, obtain a first AID, where the first AID is an AID in the response message of the first command, and the second GUC value is a quantity, stored in a non-volatile memory of the NFC terminal, of update times of all the contactless applications in the first SE.

Optionally, the processor 81 is further configured to:

after obtaining the first AID, compare the first AID with all AIDs stored in the non-volatile memory; and if the first AID is different from all the AIDs stored in the non-volatile memory, obtain an identifier SE ID of the first SE, and save, in the non-volatile memory, a data record that includes at least the first AID and the SE ID.

Optionally, the processor 81 is further configured to:

after comparing the first AID with all AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

Optionally, the processor 81 is further configured to:

send a third command to the first SE, where the third command is used to obtain AIDs of all contactless applications in the first SE, and receive a response message, sent by the first SE, of the third command; and parse the response message of the third command, to obtain a third AID, where the third AID is an AID in the response message of the third command.

Optionally, the processor 81 is further configured to:

after obtaining the third AID, compare the third AID with all AIDs stored in a non-volatile memory of the NFC terminal; and if the third AID is different from all the AIDs stored in the non-volatile memory, obtain an identifier SE ID of the first SE, and save, in the non-volatile memory, a data record that includes at least the third AID and the SE ID.

Optionally, the processor 81 is further configured to:

after comparing the third AID with all the AIDs stored in the non-volatile memory of the NFC terminal, if the third AID is the same as one AID stored in the non-volatile memory, compare a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, send a fourth command to the first SE, where the fourth command is used to query a lifecycle state of the third AID, and receive a response message, sent by the first SE, of the fourth command;

parse the response message of the fourth command, to obtain the lifecycle state of the third AID; and update the lifecycle state and the UC values that are of the third AID and that are stored in the non-volatile memory.

Optionally, the processor 81 is further configured to:

receive application change notification information sent by a server; and obtain an application identifier AID of a contactless application in a first secure element SE, where the first SE is an SE that is in a near field communication NFC terminal and that communicates with the server.

Optionally, the processor 81 is further configured to:

parse the application change notification information, to obtain an AID in the application change notification information.

Optionally, the processor 81 is further configured to:

send a first command to the first SE, where the first command is used to query a quantity of update times of all contactless applications in the first SE, and receive a response message, sent by the first SE, of the first command;

parse the response message of the first command, to obtain a first global update counter GUC value, where the first GUC value is the quantity of update times of all the contactless applications in the first SE; and when the first GUC value is different from a second GUC value, obtain a first AID, where the first AID is an AID in the response message of the first command, and the second GUC value is the quantity, stored in a non-volatile memory of the NFC terminal, of update times of all the contactless applications in the first SE.

Optionally, the processor 81 is further configured to:

send a third command to the first SE, where the third command is used to obtain AIDs of all contactless applications in the first SE, and receive a response message, sent by the first SE, of the third command; and parse the response message of the third command, to obtain a third AID, where the third AID is an AID in the response message of the third command.

Optionally, the processor 81 is further configured to:

after obtaining the AID in the application change notification information, compare the first AID with all AIDs stored in the non-volatile memory; and if the first AID is different from all the AIDs stored in the non-volatile memory, obtain an identifier SE ID of the first SE, and save, in the non-volatile memory, a data record that includes at least the first AID and the SE ID.

Optionally, the processor 81 is further configured to:

after comparing the first AID with all the AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

Optionally, the processor 81 is further configured to:

after obtaining the first AID, compare the first AID with all AIDs stored in a non-volatile memory; and if the first AID is different from all the AIDs stored in the non-volatile memory, obtain an identifier SE ID of the first SE, and save, in the non-volatile memory, a data record that includes at least the first AID and the SE ID.

Optionally, the processor 81 is further configured to:

after comparing the first AID with all the AIDs stored in the non-volatile memory, if the first AID is the same as one AID stored in the non-volatile memory, send a second command to the first SE, where the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

Optionally, the processor 81 is further configured to:

after obtaining the third AID, compare the third AID with all AIDS stored in a non-volatile memory of the NFC terminal; and if the third AID is different from all the AIDs stored in the non-volatile memory, obtain an identifier SE ID of the first SE, and save, in the non-volatile memory, a data record that includes at least the one AID that participates in the comparison and the SE ID.

Optionally, the processor 81 is further configured to:

after comparing the third AID with all the AIDs stored in the non-volatile memory of the NFC terminal, if the third AID is the same as one AID stored in the non-volatile memory, compare a first update counter UC value with a second UC value, where the first UC value is a quantity of update times of a contactless application that has the third AID, and the second UC value is a quantity, stored in the non-volatile memory, of update times of the contactless application that has the third AID;

if the first UC value is different from the second UC value, send a fourth command to the first SE, where the fourth command is used to query a lifecycle state of the third AID, and receive a response message, sent by the first SE, of the fourth command;

parse the response message of the fourth command, to obtain the lifecycle state of the third AID; and update the lifecycle state and the UC values that are of the third AID and that are stored in the non-volatile memory.

In FIG. 8, a bus architecture (which is represented by the bus 82), that is, the bus 82, may include any quantity of interconnected buses and bridges, and the bus 82 connects one or more processors that are represented by the processor 81 to various circuits of the non-volatile memory 83. The bus 82 may further connect various other circuits such as a peripheral device, a voltage stabilizer, and a power management circuit. These are known in the art, and therefore are not further described in this specification.

The processor 81 is responsible for managing the bus 82 and general processing, and the non-volatile memory 83 may be configured to store data that is used by the processor 81 when the processor 81 performs an operation.

The NFC terminal 80 in Embodiment 3 may be the NFC terminal in FIG. 1, where the NFC terminal is described in detail above. Details are not described herein again.

The NFC terminal in Embodiment 3 may perform various variation manners and specific examples in the information processing methods in the embodiments in FIG. 2 to FIG. 7. By means of the detailed descriptions of the information processing methods, persons skilled in the art can clearly know an implementation method of the NFC terminal in Embodiment 3. Therefore, for simplicity of the specification, details are not described herein again.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, an optical memory, and the like) that include computer-usable program code.

The present invention is described with reference to the flowcharts and/or block diagrams of the method, the device (system), and the computer program product according to the embodiments of the present invention. It should be understood that computer program instructions maybe used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An information processing method, comprising:
monitoring, using a processor in a near field communications (NFC) terminal, a state of a Transmission Control Protocol (TCP) connection established by at least one secure element (SE) in the NFC terminal to a server by using a TCP port of the NFC terminal;
when monitoring that the state of the TCP connection is disconnected, determining, using the processor, a first SE from the at least one SE, wherein the first SE is an SE corresponding to a TCP port whose TCP connection is disconnected; and
obtaining, using the processor, an application identifier (AID) of a contactless application in the first SE.

2. The method according to claim 1, wherein obtaining an AID of a contactless application in the first SE comprises:
sending, using the processor, a first command to the first SE, wherein the first command is used to query a quantity of update times of all contactless applications in the first SE, and receiving, using the processor, a response message, sent by the first SE, of the first command;
parsing, using the processor, the response message of the first command, to obtain a first global update counter (GUC) value, wherein the first GUC value is the quantity of update times of all the contactless applications in the first SE; and
when the first GUC value is different from a second GUC value, obtaining a first AID, wherein the first AID is an AID in the response message of the first command, and the second GUC value is a quantity, stored in a non-volatile memory of the NFC terminal, of update times of all the contactless applications in the first SE.

3. The method according to claim 2, wherein after obtaining a first AID, the method further comprises:
comparing, using the processor, the first AID with all AIDs stored in the non-volatile memory; and
if the first AID is different from all the AIDs stored in the non-volatile memory, obtaining an identifier SE ID of the first SE, and saving, in the non-volatile memory, a data record that comprises at least the first AID and the SE ID.

4. The method according to claim 3, wherein after comparing the first AID with all AIDs stored in the non-volatile memory, the method further comprises:
if the first AID is the same as one AID stored in the non-volatile memory, sending, using the processor, a second command to the first SE, wherein the second command is used to query a lifecycle state of the first AID, and receiving, using the processor, a response message, sent by the first SE, of the second command;
parsing, using the processor, the response message of the second command, to obtain the lifecycle state of the first AID; and
updating the lifecycle state that is of the first AID and that is stored in the non-volatile memory.

5. The method according to claim 1, wherein obtaining an AID of a contactless application in the first SE comprises:
sending, using the processor, a third command to the first SE, wherein the third command is used to obtain AIDs of all contactless applications in the first SE, and receiving, using the processor, a response message, sent by the first SE, of the third command; and
parsing, using the processor, the response message of the third command, to obtain a third AID, wherein the third AID is an AID in the response message of the third command.

6. The method according to claim 5, wherein after obtaining a third AID, the method further comprises:
comparing, using the processor, the third AID with all AIDs stored in a non-volatile memory of the NFC terminal; and
if the third AID is different from all the AIDs stored in the non-volatile memory, obtaining an identifier SE ID of the first SE, and saving, in the non-volatile memory, a data record that comprises at least the third AID and the SE ID.

7. The method according to claim 6, wherein after comparing the third AID with all AIDs stored in a non-volatile memory of the NFC terminal, the method further comprises:
if the third AID is the same as one AID stored in the non-volatile memory, comparing, using the processor, a first update counter UC value with a second UC value, wherein the first UC value is a quantity of update times of a contactless application that has the third AID, and the second UC value is a quantity, stored in the non-volatile memory, of update times of the contactless application that has the third AID;
if the first UC value is different from the second UC value, sending, using the processor, a fourth command to the first SE, wherein the fourth command is used to query a lifecycle state of the third AID, and receiving, using the processor, a response message, sent by the first SE, of the fourth command;
parsing, using the processor, the response message of the fourth command, to obtain the lifecycle state of the third AID; and
updating the lifecycle state and the UC values that are of the third AID and that are stored in the non-volatile memory.

8. An information processing method, comprising:
receiving, using a processor in a near field communications (NFC) terminal, application change notification information sent by a server; and
obtaining an application identifier (AID) of a contactless application in a first secure element (SE), wherein the first SE is an SE in the NFC terminal and that communicates with the server.

9. The method according to claim 8, wherein the application change notification information sent by a server is an HTTP message including a message type, an AID of a newly installed contactless application or an AID of a contactless application whose application state is updated, and an SE ID of and SE in which a newly installed contactless application or a contactless application whose application state is updated is located, and obtaining an AID of a contactless application in a first SE comprises:
parsing, using the processor, the application change notification information, to obtain an AID in the application change notification information.

10. The method according to claim 8, wherein the application change notification information sent by a server is an IP address of the server that sends the application change notification infatuation, and an SE in which a contactless application is newly installed or an application state of a contactless application is updated may be determined according to a correspondence between the IP address of the server and the SE, and obtaining an AID of a contactless application in a first SE comprises:
sending, using the processor, a first command to the first SE, wherein the first command is used to query a quantity of update times of all contactless applications in the first SE, and receiving, using the processor, a response message, sent by the first SE, of the first command;
parsing, using the processor, the response message of the first command, to obtain a first global update counter (GUC) value, wherein the first GUC value is the quantity of update times of all the contactless applications in the first SE; and
when the first GUC value is different from a second GUC value, obtaining a first AID, wherein the first AID is an AID in the response message of the first command, and the second GUC value is a quantity, stored in a non-volatile memory of the NFC terminal, of update times of all the contactless applications in the first SE.

11. The method according to claim 8, wherein the application change notification information sent by a server is an IP address of the server that sends the application change notification information, and an SE in which a contactless application is newly installed or an application state of a contactless application is updated may be determined according to a correspondence between the IP address of the server and the SE, and obtaining an AID of a contactless application in a first SE comprises:
sending, using the processor, a third command to the first SE, wherein the third command is used to obtain AIDs of all contactless applications in the first SE, and receiving, using the processor, a response message, sent by the first SE, of the third command; and
parsing, using the processor, the response message of the third command, to obtain a third AID, wherein the third AID is an AID in the response message of the third command.

12. The method according to claim 10, wherein after obtaining an AID in the application change notification information, the method further comprises:
comparing, using the processor, the first AID with all AIDs stored in the non-volatile memory; and
if the first AID is different from all the AIDs stored in the non-volatile memory, obtaining an identifier SE ID of the first SE, and saving, in the non-volatile memory, a data record that comprises at least the first AID and the SE ID.

13. The method according to claim 12, wherein after comparing the first AID with all AIDs stored in the non-volatile memory, the method further comprises:
if the first AID is the same as one AID stored in the non-volatile memory, sending, using the processor, a second command to the first SE, wherein the second command is used to query a lifecycle state of the first AID, and receiving a response message, sent by the first SE, of the second command;
parsing, using the processor, the response message of the second command, to obtain the lifecycle state of the first AID; and
updating the lifecycle state that is of the first AID and that is stored in the non-volatile memory.

14. A near field communication (NFC) terminal, comprising:
a secure element (SE) interface, configured to connect an SE to the NFC terminal;
a non-volatile memory, configured to store an application identifier (AID) of a contactless application in the SE;
a Transmission Control Protocol (TCP) port; and
a processor, connected to the non-volatile memory, the SE interface, and the TCP port by using a bus, and configured to:

monitor a state of a TCP connection that is established by at least one secure element SE in a near field communication NFC terminal to a server by using a Transmission Control Protocol TCP port of the NFC terminal, when monitoring that the state of the TCP connection is disconnected, determine a first SE from the at least one SE, wherein the first SE is an SE corresponding to a TCP port whose TCP connection is disconnected, and obtain an AID of a contactless application in the first SE.

15. The NFC terminal according to claim 14, wherein the processor is further configured to:

send a first command to the first SE, wherein the first command is used to query a quantity of update times of all contactless applications in the first SE, and receive a response message, sent by the first SE, of the first command;

parse the response message of the first command, to obtain a first global update counter (GUC) value, wherein the first GUC value is the quantity of update times of all the contactless applications in the first SE; and when the first GUC value is different from a second GUC value, obtain a first AID, wherein the first AID is an AID in the response message of the first command, and the second GUC value is a quantity, stored in a non-volatile memory of the NFC terminal, of update times of all the contactless applications in the first SE.

16. The NFC terminal according to claim 15, wherein the processor is further configured to:

after obtaining the first AID, compare the first AID with all AIDs stored in the non-volatile memory; and if the first AID is different from all the AIDs stored in the non-volatile memory, obtain an identifier SE ID of the first SE, and save, in the non-volatile memory, a data record that comprises at least the first AID and the SE ID.

17. The NFC terminal according to claim 16, wherein the processor is further configured to:

after comparing the first AID with all the AIDs stored in the non-volatile memory, if the first AID is the same as one AID stored in the non-volatile memory, send a second command to the first SE, wherein the second command is used to query a lifecycle state of the first AID, and receive a response message, sent by the first SE, of the second command;

parse the response message of the second command, to obtain the lifecycle state of the first AID; and update the lifecycle state that is of the first AID and that is stored in the non-volatile memory.

18. The NFC terminal according to claim 14, wherein the processor is further configured to:

send a third command to the first SE, wherein the third command is used to obtain AIDs of all contactless applications in the first SE, and receive a response message, sent by the first SE, of the third command; and parse the response message of the third command, to obtain a third AID, wherein the third AID is an AID in the response message of the third command.

19. The NFC terminal according to claim 18, wherein the processor is further configured to:

after obtaining the third AID, compare the third AID with all AIDs stored in a non-volatile memory of the NFC terminal; and if the third AID is different from all the AIDs stored in the non-volatile memory, obtain an identifier SE ID of the first SE, and save, in the non-volatile memory, a data record that comprises at least the third AID and the SE ID.

20. The NFC terminal according to claim 19, wherein the processor is further configured to:

after comparing the third AID with all the AIDs stored in the non-volatile memory of the NFC terminal, if the third AID is the same as one AID stored in the non-volatile memory, compare a first update counter (UC) value with a second UC value, wherein the first UC value is a quantity of update times of a contactless application that has the third AID, and the second UC value is a quantity, stored in the non-volatile memory, of update times of the contactless application that has the third AID;

if the first UC value is different from the second UC value, send a fourth command to the first SE, wherein the fourth command is used to query a lifecycle state of the third AID, and receive a response message, sent by the first SE, of the fourth command;

parse the response message of the fourth command, to obtain the lifecycle state of the third AID; and update the lifecycle state and the UC values that are of the third AID and that are stored in the non-volatile memory.

* * * * *